Sept. 21, 1954  D. F. MYERS  2,689,610
MACHINE FOR MEASURING AND CUTTING RUBBER STRIP STOCK
Filed Feb. 13, 1951  3 Sheets-Sheet 1
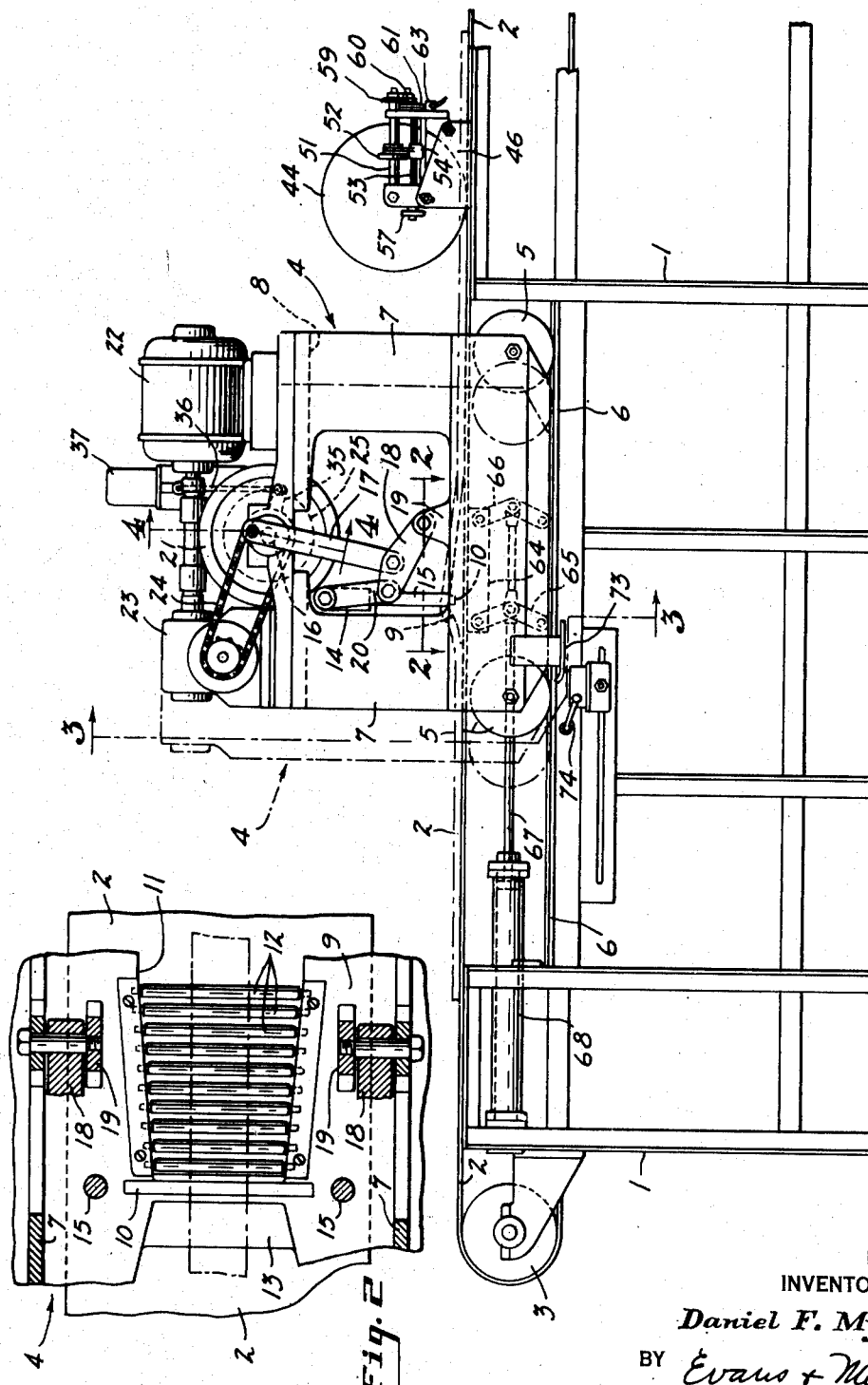
INVENTOR
Daniel F. Myers
BY Evans + McCoy
ATTORNEYS Sept. 21, 1954  D. F. MYERS  2,689,610
MACHINE FOR MEASURING AND CUTTING RUBBER STRIP STOCK
Filed Feb. 13, 1951  3 Sheets-Sheet 2
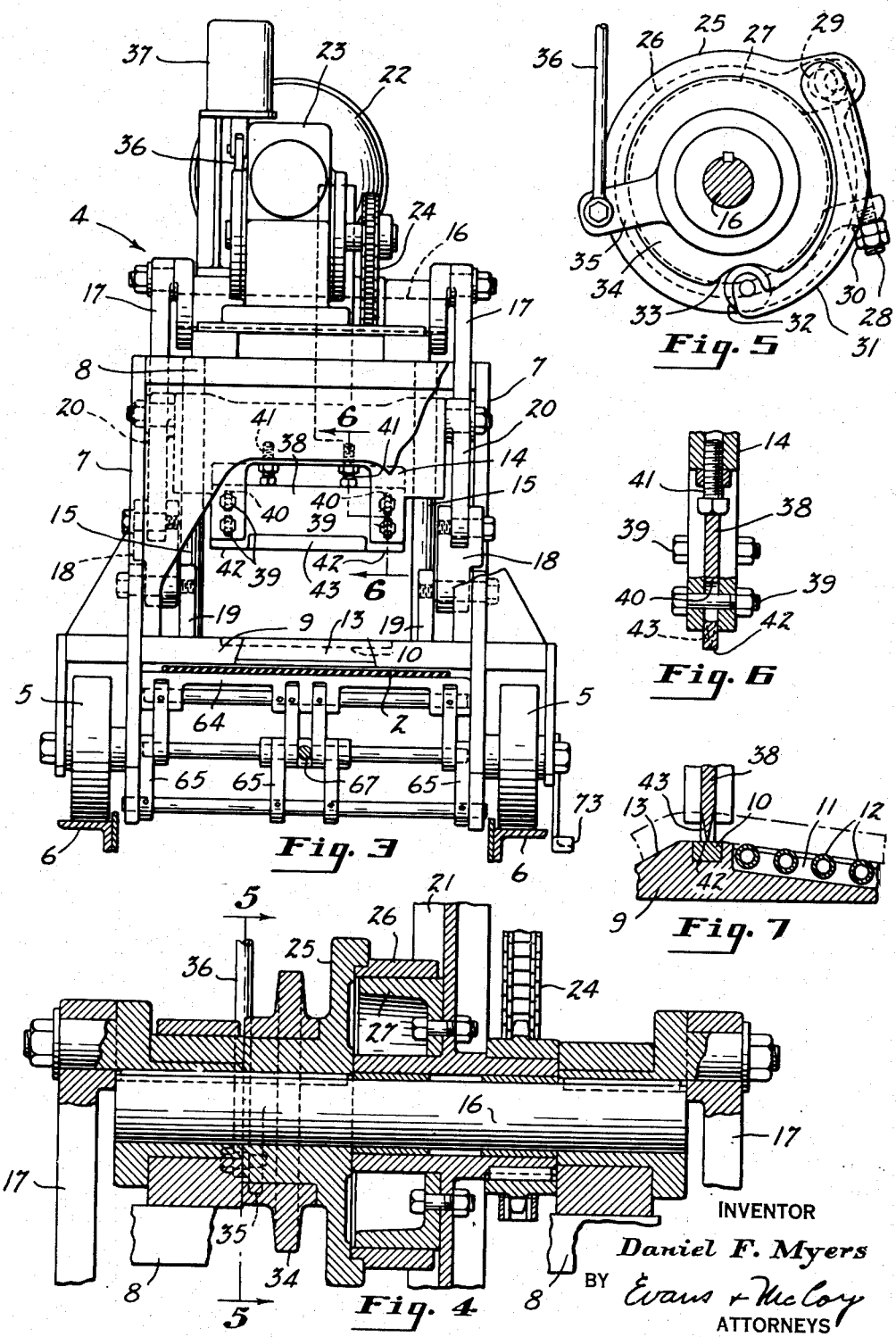
INVENTOR
Daniel F. Myers
BY Evans + McCoy
ATTORNEYS Sept. 21, 1954  D. F. MYERS  2,689,610
MACHINE FOR MEASURING AND CUTTING RUBBER STRIP STOCK
Filed Feb. 13, 1951  3 Sheets-Sheet 3

INVENTOR
Daniel F. Myers
BY Evans & McCoy
ATTORNEYS

Patented Sept. 21, 1954

2,689,610

UNITED STATES PATENT OFFICE 2,689,610

MACHINE FOR MEASURING AND CUTTING RUBBER STRIP STOCK

Daniel F. Myers, Wabash, Ind., assignor to The General Tire and Rubber Company, Akron, Ohio, a corporation of Ohio Application February 13, 1951, Serial No. 210,732

7 Claims. (Cl. 164—48)

This invention relates to stock cutters and more particularly to a machine for measuring and cutting rubber strip stock.

The machine of the present invention is designed to cut rubber strip stock as it is delivered from a calendering or extruding machine and is provided with cutter controlling means by which the stock may be cut to any desired length throughout a relatively wide range from a few inches to several feet.

The strip stock is supported on the top run of an endless belt which supports the strip and travels therewith. A bridge closely overlies the top run of the belt intermediate its ends and the strip, which lies upon the belt forwardly and rearwardly of the bridge, is arched over the bridge and slides across the bridge during its travel. The bridge has an anvil block over which the strip slides, and carries a reciprocating cutter blade that moves into and out of engagement with the anvil block to sever the strip.

The cutter is trip controlled and the trip is actuated by mechanism driven by the belt to cause the stock to be cut to the desired length.

The invention has for an object to provide a simple and easily regulated mechanism for accurately cutting strip stock to any desired length within wide limits.

A further object is to provide a stock cutting mechanism in which the stock is severed by means of a knife which is moved into and out of engagement with an anvil block over which the strip slides and which is so constructed that its sharp cutting edge is not blunted by impact against the block.

An additional object is to provide a metering device for controlling the operation of the cutter which can be quickly and easily adjusted to vary the length of stock severed from the strip.

Reference should be had to the accompanying drawings forming a part of this specification, in which:

Figure 1 is a side elevation of a machine embodying the invention;

Fig. 2 is a fragmentary horizontal section on an enlarged scale taken on the line indicated at 2—2 in Fig. 1 and showing the stock lifting bridge in plan;

Fig. 3 is a vertical transverse section taken on the line indicated at 3—3 in Fig. 1;

Fig. 4 is a fragmentary vertical section taken on the line indicated at 4—4 in Fig. 1;

Fig. 5 is a vertical section taken on the line indicated at 5—5 in Fig. 4;

Fig. 6 is a fragmentary section through the cutter taken on the line indicated at 6—6 in Fig. 3;

Fig. 7 is a fragmentary vertical section through the bridge and cutter showing the cutter in engagement with the anvil block on the bridge;

Figures 8, 9:
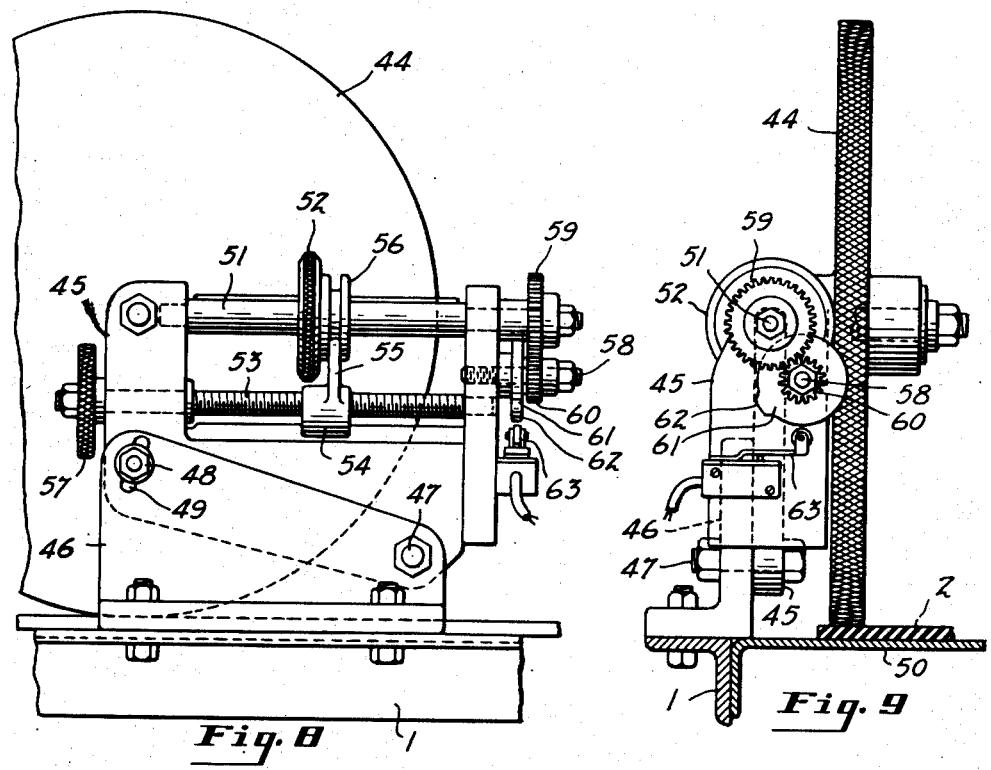
Fig. 8 is a side elevation of the metering mechanism.
Fig. 9 is a fragmentary vertical section showing the metering mechanism in rear elevation.

As shown in the accompanying drawings, a frame 1 supports an endless belt 2 in horizontal position. The belt 2 runs over a forward pulley 3 and the top run thereof is positioned to receive a strip of rubber stock from an extruding or calendering machine (not shown). The belt 2 is driven at a linear speed equal to the speed at which the strip is delivered to the belt and serves to carry the strip forwardly away from such extruding or calendering machine.

Intermediate the ends of the belt a carriage 4 is mounted for movement parallel to the top run of the belt on wheels 5 that travel on horizontally disposed rails 6 at opposite sides of the frame 1. The carriage has a frame which includes side plates 7, a top platform 8 and a bridge 9 which connects the side plates 7 and closely overlies the top run of the belt 2. The bridge 9 may be in the form of a metal plate having an anvil block 10 mounted therein and forming a portion of its top face adjacent its forward edge, the anvil block being preferably formed of a metal or other material softer than the metal of the plate, such as copper or other soft metal. Rearwardly of the anvil block 10 the plate 9 has a recess 11 in which a series of small anti-friction rollers 12 are mounted. The rollers 12 permit the strip of rubber stock to be dragged over the bridge with a minimum of frictional resistance. Forwardly of the anvil 10 the bridge has a relatively steep downwardly inclined forward edge 13.

A cutter frame 14 is mounted for vertical reciprocating movement in the carriage 4, being mounted for sliding movement on vertical guides 15 and being reciprocated on the guides by means of a crank shaft 16 extending transversely across the carriage frame. The crank shaft 16 is connected by links 17 to levers 18 pivoted at their rear ends to standards 19 on the carriage 4, the free ends of the levers 18 being connected by links 20 to the cutter frame 14. By means of the link and lever connection a vertical reciprocating movement is imparted to the cutter frame 14 upon each revolution of the crank shaft 16. The operation of the crank shaft 16 is so controlled that one revolution is imparted to the crank shaft at intervals timed to cut the stock to the desired length.

A flywheel 21 is rotatably mounted on the crank shaft 16 and is continuously driven by an electric motor 22 mounted on the platform 8, the motor 22 driving the flywheel 21 through reduction gearing in a housing 23 and through a sprocket chain 24. The crank shaft is intermittently connected to the flywheel 21 by means of a one revolution clutch which imparts a cutting stroke to the frame 14. The clutch includes a wheel 25 keyed to the shaft 16 and having mounted thereon a friction band 26 which extends around a drum 27 attached to the wheel 21. The ends of the friction band 26 are connected by a bolt 28 connected to one of the ends of the band by an eccentric pivot 29 and carrying a nut 30 engaging with the other end of the band to adjust the band to vary the clearance between the band and the drum 27.

A lever 31 attached to the eccentric pivot 29 has a roller 32 at its free end which engages in a notch 33 in a cam 34 that is rotatably mounted on the shaft 16. The free end of the lever 31 is urged toward the cam 34 by the spring action of the friction band which tends to expand away from the drum 27. When the roller 32 engages in the notch 33 the band 26 is disengaged. Turning movement of the cam 34 forces the free end of the lever 31 outwardly and this movement of the lever serves to draw the ends of the band together and cause the band to grip the drum 27, causing the wheel 25 and the crank shaft 16 to turn with the flywheel 21. The cam 34 has a radially projecting arm 35 to which is attached a rod 36 which is actuated by a solenoid 37. The energization of the solenoid 37 moves the cam 34 far enough to cause the roller 32 to ride out of the notch 33 and apply the friction band 26 to the drum 27.

The rotation of the wheel 25 and band 26 causes the roller 32 to travel around the cam 34 until the wheel 25 has made a complete revolution and the roller 32 has returned into the notch 33 to release the wheel 25 from the flywheel 21 and shaft 16. The solenoid 37 is only momentarily energized so that the cam 34 returns by gravity to its original position during the travel of the roller 32 around the cam. The actuation of the solenoid 37 causes the crank shaft to make a complete revolution and stop, and this rotation of the cam shaft imparts a vertical reciprocating movement to the cutter frame 14 to sever the stock. The stock is severed by means of a cutter bar 38 that is adjustably mounted in the cutter frame 14, the ends of the bar 38 being attached to the frame by means of bolts 39 that pass through vertical slots 40 in the bar 38. The top edge of the cutter bar is engaged by leveling screws 41 which are mounted in the frame 14 for vertical adjustment. By loosening the bolts 39 and adjusting the screws 41 the cutter bar 38 can be leveled and adjusted to the desired vertical position in the frame 14.

The cutter bar 38 is designed to move into and out of engagement with the anvil block 10 and is provided with end portions 42 that have flat bottom faces engageable with the top face of the anvil block 10. Intermediate the end portion 42 the cutter bar has a knife blade portion 43 which tapers to a sharp edge that lies substantially in the plane of the bottom faces of the end portions 42. The cutter bar 38 is so adjusted in the cutter frame 14 that its bottom edge contacts with the anvil block 10 at the lower end of the cutting stroke. Since the knife edge lies in the plane of the bottom faces of the end portions 42 of the cutter bar, it can be brought into substantial contact with the anvil block without being blunted by impact against the block. The length to which the stock is cut is determined by a metering mechanism which controls the energization of the solenoid 37. The metering mechanism is driven by the belt 2 and is provided with a large diameter friction disk 44 in contact with the top face of the belt 2. The disk 44 is mounted in an adjustable frame 45 that is carried by a bracket 46 attached to a side rail of the frame 1. The frame 45 is connected to the bracket 46 by a pivot 47 and rearwardly of the pivot 47 is connected to the bracket 46 by means of a bolt 48 that passes through an arcuate slot 49 in the bracket. By loosening the bolt 48 the frame carrying the friction disk 44 may be adjusted vertically to press the periphery of the disk 44 against the top face of the belt 2, the belt 2 being backed beneath the wheel 44 by a bed plate 50.

The frame 45 carries a horizontal shaft 51 which extends parallel to the face of the disk 44 and substantially radially of the disk. A friction wheel 52 is slidably keyed to the shaft 51 and engages with the face of the disk 44. A horizontal screw 53 mounted in the frame 46 below the shaft 51 carries a nut 54 which has a fork 55 engaging a grooved collar 56 attached to the friction wheel 52. The screw 53 is provided with a handwheel 57 by means of which it may be turned to adjust the nut 54 and with it the friction wheel 52 radially toward and away from the center of the disk 44.

A shaft 58 is journaled in the frame 46 below the rear end of the shaft 51 and is driven from the shaft 51 through gears 59 and 60. The shaft 58 carries a cam 61 which has a cam lug 62 that engages with a trip switch 63 which when closed energizes the solenoid 37. By radially adjusting the friction wheel 52, the speed of rotation of the shaft 51 can be varied throughout a relatively wide range and the rate of rotation of the shaft 51 determines the time interval between successive actuations of the switch 63. The gears 59 and 60 may be pick-off change gears to further increase the range of speeds of the trip actuating cam 61.

Since the disk 44 has a peripheral speed exactly equal to the linear speed of the belt 2 which travels with the rubber stock, the extent of travel of the stock between successive actuations of the cutter is accurately measured and by adjusting the friction wheel 52 and substituting pick-off gears 59 and 60, the length to which the stock is cut may be adjusted from a few inches to several feet.

Figure 10:
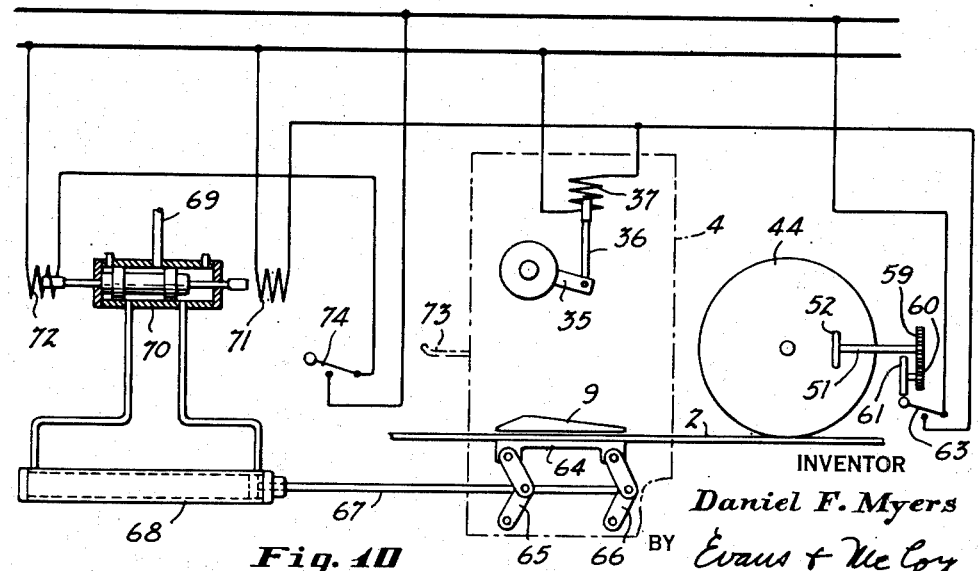
Fig. 10 is a wiring diagram showing the electrical control circuits.

If the feed of the stock is relatively rapid, or if the stock is relatively heavy, it is desirable that the anvil block travel with the conveyor belt during the cutting stroke. To accomplish this result a clamping plate 64 is mounted for vertical movement on the carriage beneath the bottom of the bridge 9 and under the top run of the belt. The plate 64 is movable vertically to clamp the belt against the bottom of the bridge 9. The clamping plate 64 is supported on the frame 1 by front and rear toggles 65 and 66, the pivots of which are connected to a horizontal piston rod 67 which extends to the piston of a horizontal cylinder 68. The cylinder 68 receives pressure from a pressure line 69 through a spool valve 70 that is controlled by solenoids 71 and 72. The piston rod 67 is normally held in its rearmost position as shown in Fig. 10. The solenoid 71 is in parallel with the solenoid 37 and is energized upon closing of the switch 63 so that the valve 70 is shifted to reverse the pressure of the cylinder 68 and move the rod 67 forwardly to shift the plate 64 into clamping engagement with the belt 2.

The carriage 4 carries a trip arm 73 that engages with a trip switch 74 upon forward movement of the carriage and the switch 74 when closed energizes the solenoid 72 to shift the valve 70 to again reverse the pressure in the cylinder 68 and the rod 67 rearwardly to release the plate 64 and return the carriage to its original position. The trip switch 74 is adjustably mounted on the frame 1 and is positioned to return the carriage immediately after the cutting blade has severed the strip and moved upwardly far enough to clear the strip, the adjustment of the switch 74 being so related to the speed of travel of the belt that the cutting stroke is effected while the carriage is moving with the belt.

During the cutting stroke the portion of the strip ahead of the knife blade sags down upon the inclined forward edge 13 of the bridge, moving the end face of the severed piece away from the front face of the knife as the strip is being severed.

It is to be understood that variations and modifications of the specific devices herein shown and described for purposes of illustration, may be made without departing from the spirit of the invention.

What I claim is:

1. A machine for severing rubber strip stock during continuous endwise movement thereof comprising an endless belt having a top run underlying, supporting and moving with a portion of said strip, a strip lifting bridge closely overlying and extending transversely across said top run intermediate its ends, said bridge having a narrow transversely extending flat top portion that serves as an anvil block, a roller bed rearwardly of said flat top portion and a short relatively steep portion extending forwardly and downwardly from said anvil portion, and a cutter blade mounted for reciprocating movement downwardly toward and upwardly away from said anvil block for severing said strip.

2. A machine for severing rubber strip stock during continuous endwise movement thereof comprising an endless belt having a top run movable with the strip and supporting the same, a carriage mounted for movement longitudinally of said belt, a strip lifting bridge on the carriage extending transversely across said top run, a crank shaft on said carriage, a reciprocating cutter mounted on the carriage for movement toward and away from said bridge to sever the strip and connected to said crank shaft, a drive shaft, means including a one revolution clutch connecting said crank shaft to said drive shaft, a trip controlling said clutch, means actuated by said belt for controlling said trip, means controlled by said trip and operated independently of said crank shaft for clamping said carriage to said belt for movement therewith, and means controlled by a movement of said carriage with the belt for returning said carriage to its normal position.

3. A machine for severing rubber strip stock during continuous endwise movement thereof comprising an endless belt having a top run movable with the strip and supporting the same, a carriage mounted for movement longitudinally of said belt, a strip lifting bridge on the carriage closely overlying and extending transversely across said top run, a crank shaft on said carriage, a reciprocating cutter mounted on the carriage for movement toward and away from said bridge to sever the strip and connected to and actuated by said crank shaft, a drive shaft, means including a one revolution clutch connecting said crank shaft to said drive shaft to impart a reciprocation to said cutter to sever the strip, a trip controlling said clutch, a cam for actuating said trip, means including a variable ratio driving connection for driving said cam from said belt, means controlled by said trip for clamping said carriage to said belt for movement therewith during severing movement of said cutter, and means for returning said carriage to its normal position after completion of said severing movement.

4. A machine for severing rubber strip stock during continuous endwise movement thereof comprising an endless belt having a top run movable with the strip and supporting the same, a carriage mounted for movement longitudinally of said belt, a strip lifting bridge on the carriage extending transversely across said top run, a crank shaft on said carriage, a reciprocating cutter mounted on the carriage for movement toward and away from said bridge to sever the strip and connected to and actuated by said crank shaft, a motor on said carriage, a driving connection between said motor and crank shaft including a one revolution clutch operable to impart a revolution to said crankshaft to reciprocate said cutter, a trip controlling said clutch, a cam for operating said trip, a driving connection between said cam and said belt, means controlled by said trip for clamping said carriage to said belt for movement therewith, and means responsive to a movement of said carriage with the belt for returning said carriage to its normal position after a predetermined movement thereof.

5. A machine for severing rubber strip stock during continuous endwise movement thereof comprising an endless belt having a top run supporting the strip and moving with the strip, a carriage movable lengthwise of said top run, a strip lifting bridge on said carriage closely overlying and extending across said top run, said bridge having a narrow transversely extending anvil block over which the strip slides, a steeply inclined downwardly sloping portion forwardly of said block and a roller bed rearwardly of said block, a cutter mounted on said carriage for movement into and out of engagement with said block, means for actuating said cutter, and a metering device driven by said belt for controlling the operation of said cutter.

6. A machine for severing rubber strip stock during continuous endwise movement thereof comprising an endless belt having a top run supporting the strip and moving with the strip, a carriage movable lengthwise of said top run, a strip lifting bridge on said carriage closely overlying and extending across said top run, said bridge having a narrow transversely extending anvil block over which the strip slides, a steeply inclined downwardly sloping portion forwardly of said block and a roller bed rearwardly of said block, a cutter mounted on said carriage for movement into and out of engagement with said block, a trip, a mechanism controlled by the trip for imparting a cutting stroke to said cutter, means driven by the belt for actuating said trip, means controlled by said trip for clamping said carriage to said belt for movement therewith during the cutting of the strip, and means controlled by a movement of said carriage for returning said carriage to its original position after a predetermined movement thereof.

7. A machine for severing rubber strip stock during continuous endwise movement thereof comprising an endless belt having a top run supporting the strip and moving with the strip, a carriage movable lengthwise of said top run, a strip lifting bridge on said carriage closely overlying and extending across said top run, said bridge having an anvil block over which the strip slides, a cutter mounted on said carriage for movement into and out of engagement with said block, a trip, means controlled by the trip for imparting a cutting stroke to said cutter, means driven directly by the belt for actuating said trip in response to a predetermined movement of the endless belt, means controlled by said trip for clamping said carriage to said belt for movement therewith during the cutting of the strip, and means controlled by a movement of said carriage for returning said carriage to its original position after a predetermined movement thereof.

References Cited in the file of this patent

UNITED STATES PATENTS

| Number | Name | Date |
|---|---|---|
| 707,294 | Blackhall | Aug. 19, 1902 |
| 1,176,680 | Langston | Mar. 21, 1916 |
| 1,321,207 | Hawkins | Nov. 11, 1919 |
| 1,417,117 | Tyler | May 23, 1922 |
| 1,751,451 | Smith | Mar. 18, 1930 |
| 1,830,876 | Kay et al. | Nov. 10, 1931 |
| 1,993,393 | Willshaw | Mar. 5, 1935 |
| 2,042,829 | Carlin | June 2, 1936 |
| 2,178,710 | Valiquette | Nov. 7, 1939 |
| 2,294,020 | Breth | Aug. 25, 1942 |
| 2,305,928 | Littell | Dec. 22, 1942 |
| 2,313,986 | Brown | Mar. 16, 1943 |
| 2,379,682 | Colucci et al. | July 3, 1945 |